US008046558B2

(12) United States Patent
Ghose

(10) Patent No.: US 8,046,558 B2
(45) Date of Patent: Oct. 25, 2011

(54) FILE SYSTEM HAVING PREDICTABLE REAL-TIME PERFORMANCE

(75) Inventor: Kanad Ghose, Vestal, NY (US)

(73) Assignee: The Research Foundation of State University of New York, Binghamton, NY (US)

( * ) Notice: Subject to any disclaimer, the term of this patent is extended or adjusted under 35 U.S.C. 154(b) by 0 days.

(21) Appl. No.: 11/532,197

(22) Filed: Sep. 15, 2006

(65) Prior Publication Data

US 2007/0067595 A1 Mar. 22, 2007

Related U.S. Application Data

(60) Provisional application No. 60/717,778, filed on Sep. 16, 2005.

(51) Int. Cl.
*G06F 12/00* (2006.01)
*G06F 13/00* (2006.01)
(52) U.S. Cl. ........ 711/167; 711/100; 711/112; 711/125; 711/158
(58) Field of Classification Search .................. 711/100, 711/112, 125, 154, 158, 167
See application file for complete search history.

(56) References Cited

U.S. PATENT DOCUMENTS

| | | | | |
|---|---|---|---|---|
| 5,729,718 | A * | 3/1998 | Au | 711/167 |
| 6,182,197 | B1 | 1/2001 | Dias et al. | |
| 6,397,258 | B1 | 5/2002 | Tsuji et al. | |
| 6,539,440 | B1 * | 3/2003 | Stracovsky et al. | 710/58 |
| 6,877,072 | B1 | 4/2005 | Dias et al. | |

FOREIGN PATENT DOCUMENTS

EP 385655 A2 * 9/1990

OTHER PUBLICATIONS

Kamel et al., A novel deadline driven disk scheduling algorithm for multi-priority multimedia objects, Mar. 3, 2000, "Data Engineering, 2000 . . . ", abstract (1 page) and full disclosure (10 pages).*
Bosch, et al., "Real-time Disk Scheduling in a Mixed-Media File System", In Proc. RTSS-2000.
Shenoy, et al., "Cello: A Disk Scheduling Framework for Next Generation Operating Systems", Technical Report, Univ. of Texas at Austin, 1996.
Gopalan, "Realtime disk scheduling using deadline sensitive scan", Technical Report TR-92, Dept. of Computer Science, State University of New York, Stony Brook, 2001.
Reuther, et al., "Rotational-Position-Aware Real-Time Disk Scheduling Using a Dynamic Active Subset (DAS)", in Proc. Real-Time System Symposium (RTSS), 2003.

* cited by examiner

*Primary Examiner* — Tuan V. Thai
(74) *Attorney, Agent, or Firm* — Steven M. Hoffberg; Ostrolenk Faber LLP

(57) ABSTRACT

A file system that permits predictable accesses to file data stored on devices that may have a variable access latency dependent on the physical location of the file on the physical storage device. A variety of features that guarantee timely, real-time response to I/O file system requests that specify deadlines or other alternative required quality-of-service parameters. The file system addresses needs to accommodate the file systems of storage devices such as disks that have an access time dependant on the physical location of the data within the storage device. A two-phase, deadline-driven scheduler considers the impact of disk seek time on overall response times. Non real-time file operations may be preempted. Files may be preallocated to help avoid access delay caused by non-contiguity. Disk buffers may also be preallocated to improve real-time file system performance.

22 Claims, 2 Drawing Sheets

FILE SYSTEM HAVING PREDICTABLE REAL-TIME PERFORMANCE

RELATED APPLICATIONS

The present application claims benefit of priority from U.S. Provisional Patent Application 60/717,778, filed Sep. 16, 2005, which is expressly incorporated herein by reference.

FIELD OF THE INVENTION

The invention pertains to mass data storage systems and, more particularly to a file management system wherein data access times and/or execution orders are predictable and guaranteed.

BACKGROUND OF THE INVENTION

Online mass storage facilities that provide real-time performance are becoming essential components of emerging safety-critical systems, such as, for example, avionics systems. Such systems typically need to acquire and process large amounts of data. In addition, such systems typically need to decouple the producers and consumers of the information to be processed. These systems have a variety of storage access requirements ranging from guaranteed hard, real-time access to critical data to soft, non-real time access to other, less critical types of stored data.

As embedded safety-critical systems have become increasingly sophisticated and data-intensive, it has becomes necessary for task software system components to access data from bulk storage devices, for example disk drives, CD/DVD drives, flash memory, as well as any other non-volatile storage device. Such exemplary bulk storage devices may be used to store flight data logs in a continuous manner, to hold flight planning information, and to hold map data, to name a few typical applications thereof. Efficient storage and access to data on such bulk storage devices require the use of file system software, analogous to file systems that are found in traditional operating systems (OS). However, unlike these traditional OS file systems, the file systems used in safety critical, real-time embedded systems must guarantee that the file operations, specifically file operations that access data stored on the mass storage devices, be completed by either explicitly or implicitly specified time deadlines for the requested file operation.

DISCUSSION OF THE RELATED ART

Several attempts are known in the prior art to provide on time, predictable file access in safety-critical systems. For example, U.S. Pat. No. 6,877,072 for REAL-TIME SHARED DISK SYSTEM FOR COMPUTER CLUSTERS, issued Apr. 5, 2005 to Daniel Manuel Dias et al. provide a shared storage system in which multiple readers and writers access data and in which requests to individual storage devices are ordered by priorities. However, Dias et al. do not include features provided in the present invention to provide predictable real time file system behavior. In addition, Dias et al. deal with request priorities only at the level of the storage device (i.e., the hardware) level.

U.S. Pat. No. 6,397,258 for FILE SYSTEM, issued May 28, 2002 to Atsuhiro Tsuji et al. describes a file system which regulates the bandwidth of read and write requests and data prefetching to provide predictable behavior. The present invention differs from the Tsuji et al. system by making use of a deadline or priority based scheduling technique and other mechanisms to provide real-time behavior.

U.S. Pat. No. 6,182,197 for REAL-TIME DISTRIBUTED FILE SYSTEM, issued Jan. 30, 2001 to Daniel Manuel Dias et al. describes a distributed file storage system that incorporates a dedicated file system controller on each node. Dias et al. describe how the controllers cooperate to implement a fast, distributed file storage system. However Dias et al. provide no specific teaching of real-time behavior.

In many real time kernels, the file system component, if present, is treated as a second-class component, without any design features that support real-time requirements. In academia, the bulk of the existing prior art work on "real time" file systems, as well as file system implementations in existing products provide file systems that meet the requirements of multi-media playback. Some exceptions to this are the work of Bosch and Mullender (Bosch, P., and Mullender, S. J., "*Real-time Disk Scheduling in a Mixed-Media File System*". In Proc. RTSS-2000) on real-time, deadline-driven disk scheduling and the work of Shenoy et al. on the Cello disk scheduler, a deadline driven I/O scheduler (Shenoy, P. J., and Vin, H. M., "*Cello: A Disk Scheduling Framework for Next Generation Operating Systems*", Technical Report, Univ. of Texas at Austin, 1996). Other work on real-time disk scheduling includes the work of Gopalan (Gopalan, K., "*Realtime disk scheduling using deadline sensitive scan*", Technical Report TR-92, Dept. of Computer Science, State University of New York, Stony Brook, 2001) and the rotational/position-aware disk scheduler of Reuther and Pohlack (Reuther, L. and Pohlack, M., "*Rotational-Position-Aware Real-Time Disk Scheduling Using a Dynamic Active Subset (DAS)*", in Proc. Real-Time System Symposium (RTSS), 2003). However, unless the entire file system and related operating systems functions, such as storage and buffer cache management, implement service guarantees and deadlines, a real-time disk scheduler by itself cannot guarantee meeting hard explicit or implicit deadlines.

None of these United States patents or referenced publications, taken individually or in any combinations, teach or suggest a file system that offers hard, real-time file system performance guarantees, when required, to calling processes.

SUMMARY OF THE INVENTION

The present invention provides a file system (FS) that meets the timing requirements of real-time systems and further allows the use of storage devices that may have a variable access time. The inventive file system ensures that accesses to critical files are completed by implicitly or explicitly specified deadlines or orderings while allowing accesses to other files that do not require such guarantees on their accesses. The present invention therefore enhances the ability to deploy such file systems in environments which are safety-critical, or mission-critical.

In contrast to the method of U.S. Pat. No. 6,877,072, an embodiment of the present invention deals with priorities at the file system level and performs at least two scheduling phases. A first priority (i.e., a high level priority) is provided to order requests for file accesses independently of the nature of the actual storage device. A second embodiment of the present invention deals with priorities at the device (i.e., hardware) level to address device-specific considerations of mass storage devices that have physical location-dependent access delays. Various embodiments of the present invention also provide techniques for implementing real-time file operations with hard guarantees on the timing of file operations, specifically data access file operations.

In accordance with aspects of the present invention, there is provided a file system that permits predictable accesses to file data stored, or to be stored, on devices that may have a variable access latency dependent on the physical location of the file on the physical storage device. This predictable access allows reliable, on-time completion of data access tasks having either an explicitly or implicitly specified deadline, or another quality-of-service parameter. In addition, an embodiment of the file system of the present invention is responsive to other similar requests for ordering file access requests.

Aspects of the present invention also provide a variety of features that guarantee timely, real-time response to I/O file system requests that specify deadlines or other alternative required quality-of-service parameters. The inventive file system addresses specific needs to accommodate the file systems of storage devices, such as disks that have an access time dependant on the physical location of the data within the storage device. Hard disk drives are an example of such storage devices where access time is dependent on the time it takes for the disk head to move to the disk track (i.e., seek time) containing the desired data. Such features of the file system of the invention include: using a two-phase, deadline-driven scheduling that considers the impact of disk seek time on overall response times; requesting preemption of non-real-time critical file accesses within the file system; pre-allocating disk storage based on anticipated specified file dimensions; preallocating disk buffers; and incorporating a non-volatile memory device, ubiquitous in many embedded platforms, for implementing asynchronous writes to the disk and for implementing a journal that can be used to quickly recover the file system in the event of a crash.

The present invention therefore provides, as one embodiment, a model of a physical data storage system, and selectively allocates certain locations in dependence on temporal constraints, which may be state dependent or state independent. The model therefore provides an estimate of a worst-case access or process completion time, and schedules accordingly. Within these worst case limits, other operations may be interspersed; that is, tasks that are of low priority or have longer permissible latencies may be grouped or deferred. This, in turn, allows more predictable and prolonged time windows for processes of higher priority and/or lower permissible latency. Thus, for example, high priority processes do not necessarily preempt lower priority processes, if the former can be guaranteed to complete within its required window. Likewise, processes may be reordered as necessary. Thus, in addition to facilitating real-time performance for processes as required, aspects of the present invention also permit optimization of non-real-time processes and coordination of both types of processes.

It is, therefore, an object of the invention to provide a file system for use in real-time systems.

It is another object of the invention to provide a file system wherein real-time file operations are completed within a guaranteed time window.

It is another object of the invention to provide a file system wherein real-time file operations are completed to comply with other quality-of-service parameters.

It is an additional object of the invention to provide a file system wherein real-time file operations are completed in a guaranteed sequence.

It is a further object of the invention to provide a file system that utilizes a two-phase scheduler for real-time file operation requests.

It is yet another object of the invention to provide a file system wherein non real-time file operations may be preempted.

It is a still further object of the invention to provide a file system wherein file storage areas may be prealloacted to avoid non-contiguous files.

It is an additional still further object of the invention to provide a file system wherein buffers may be prealloacted.

Another object of the invention provides an apparatus, method, and software for a programmable device for managing access to a file storage system having predictable variable latency, comprising providing at least one queue of operations, at least a portion of the operations having associated operation time constraints for completion; receiving at least one request for completion of a new operation within a respective new operation time constraint for completion; inserting the new operation into the queue of operations, consistent with completion within the respective new operation time constraint; and, for at least one new operation, reordering the queue to defer processing of at least one operation inconsistent with completion of processing of the new operation within the respective new operation time constraint, wherein the at least one operation which is deferred is placed in a queue position consistent with completion within its associated operation time constraint. At least a portion of the operations may have no deadline for completion, in which case such operations may be preempted by the new operation. At least one operation in the queue may have a deadline time constraint, and operations may also have associated relative priorities, with a lower priority operation deferring to, or being preempted by, a higher relative priority. At least one request for operation may be associated with a predictable variable operation time constraint for completion, and at least one operation may not be associated with a predictable variable operation time constraints for completion. Likewise, at least one request for operation may be associated with a preassigned priority, and at least one operation may not be associated with a preassigned priority.

According to another object of the invention, a system, method, and software for a programmable device, is provided for managing access to a file storage system having predictable variable latency for file system operations, comprising providing a queue of operations to be performed, each operation having a predicted variable latency, and at least a portion of the operations having associated operation time constraints for completion; receiving at least one request for completion of a new operation having a predicted variable latency and an associated new operation time constraint for completion; and inserting the new operation into the queue of operations, consistent with performing all queued operations having associated time constraints within their respective associated operation time constraints, based on at least available time and predicted variable latencies of the respective operations, and for at least one new operation, deferring at least one operation previously in the queue.

It is a still further object of the invention to provide a system, method and software for a programmable device, for managing access to a file storage system having predictable variable latency, comprising providing at least one scheduling queue of operations, at least a portion of the operations having associated operation time constraints for completion; receiving at least one request for completion of a new operation within a respective new operation time constraint for completion; inserting the new operation into the scheduling queue of operations; reordering the scheduling queue in accordance with a first criterion; and subsequently reordering the scheduling queue in accordance with a second criterion, wherein: for at least one new operation, the reordering the scheduling queue and subsequent reordering of the scheduling queue together defer or preempt processing of at least one operation inconsistent with completion of processing of the new operation within the respective new operation time constraint; the at least one operation which, if deferred, is placed in a scheduling queue position consistent with completion within its associated operation time constraint; the scheduling queue ordering in any phase can result in the preemption or deferring of operations previously ordered by the scheduling queue steps of each phase; the scheduling queue is analyzed to remove dependent operations from a preempted operation, and requests for operations resulting from the reordering the scheduling queue in accordance with a first criterion can be preempted by said subsequently reordering the scheduling queue in accordance with a second criterion.

BRIEF DESCRIPTION OF THE DRAWINGS

A complete understanding of the present invention may be obtained by reference to the accompanying drawings, when considered in conjunction with the subsequent, detailed description, in which.

DETAILED DESCRIPTION OF THE PREFERRED EMBODIMENT

Figure 1:
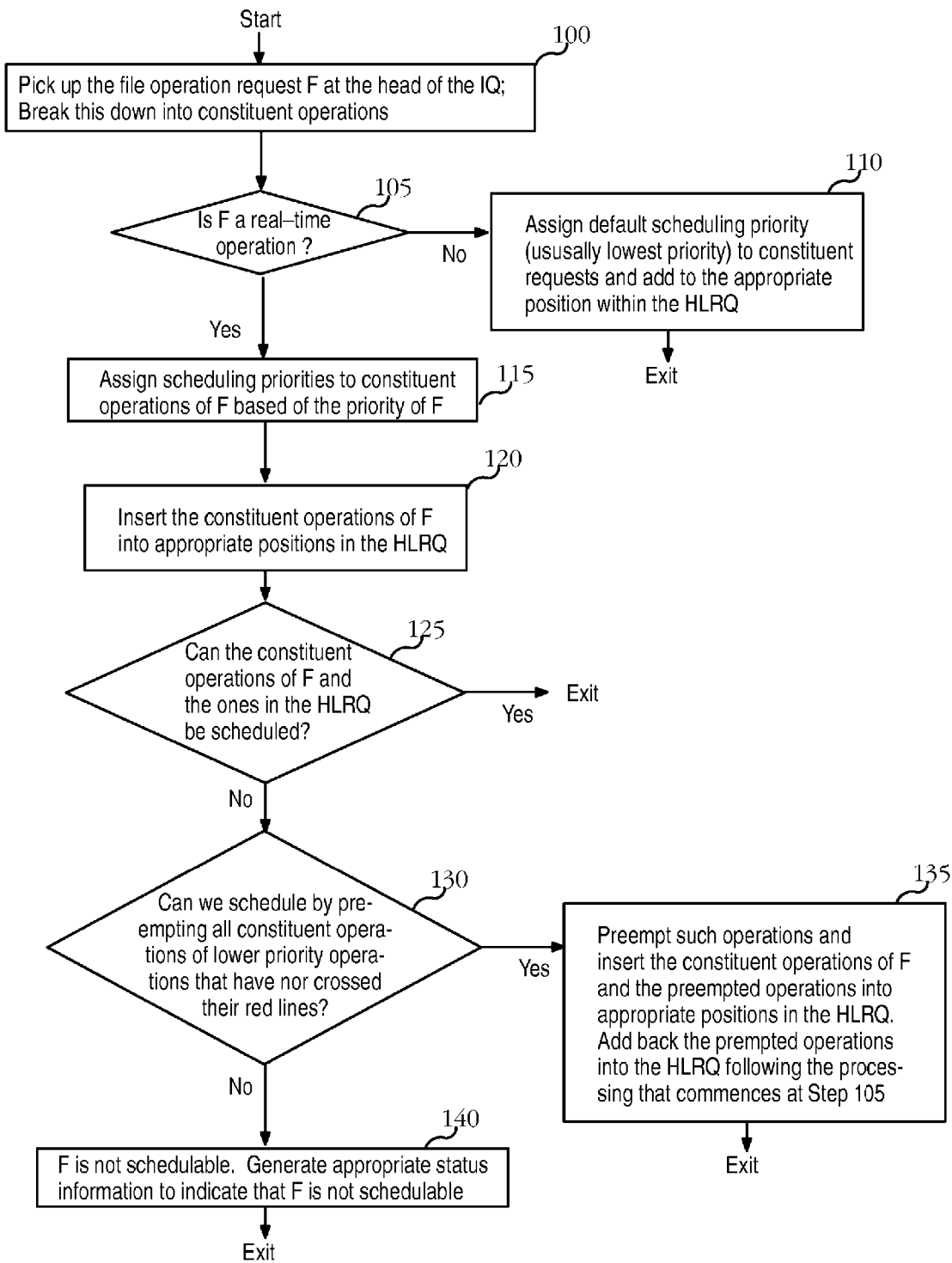
FIG. 1 is a flowchart of the first phase of a two-phase scheduling process in accordance with an embodiment of the invention.

The present invention is a system and method for storing and accessing data arranged into files and stored on mass storage devices. Such mass storage devices include devices whose access time is a function of the physical location of the data within the device. When required, the inventive file system guarantees a response time for a data access operation. Such guarantees are critical in many real time systems.

The file system of the present invention provides a set of operations for file management such as data retrieval and data updating of files stored on storage devices. The methods are collectively referred to as file operation requests. The unique features of the present invention are now described in detail.

First, a method of scheduling file operations and access requests is provided. The inventive scheduling method is based on explicit or implicit parameters specified by real-time processes. The inventive access method schedules file operations to ensure that the requested operations are completed within the requested time.

The present invention also provides a method of creating files on a storage device in a manner based on specifications that are supplied by the file system or user thereof.

The specifications may be implicit, explicit or a combination of both implicit and explicit directives. By structuring files using such directives or specifications, file structures are provided that help ensure later time-bounded access thereto. In addition to specifying permissible, mandatory, or prohibited storage locations for files, the directives or specifications may provide more complex limitations, contingent file location specifiers, or provide dependencies between file length, file content, and storage location. One example of a file content dependent storage location is where the file is compressed using a content-varying compression ratio, such as a run-length limited schema. In that case, the length of the compressed file will be dependent on its content, and the permissible locations for storing that compressed filed will vary in dependence on available storage capacity at respective locations and the length of the file.

Also provided in accordance with the present invention is a method of opening a required file for access based on specifications that are supplied by the file system user. Such specifications may be explicit, implicit, or a combination of implicit and explicit. Such specifications indicate file system parameters that also help ensure timely, real-time access to file data.

The present invention also provides a method of reading and writing data from and to a specified file that has been opened based on specifications that are supplied by the file system user. Such read-out methods also help ensure timely access to the data.

Also provided is a set of methods that both control exclusive access to specified regions within an open file while generally supporting concurrent operations within other portions of a data file.

The file system of the present invention provides file operations that may include:

- One or more operations for creating a file. These operations may allocate the necessary data structures on a specified storage device for implementing the actual file.
- One or more operations for opening a file for reading information in the file and/or for writing information in the file.
- Operations for reading information stored in the specified file and for writing out information to the specified file.
- A set of miscellaneous operations, including, but not limited to: operations that can change the size of the stored file, operations that can allow exclusive access to the entire file, or specified regions of the file, and operations that rename a file.
- One or more operations for deleting a specified file. It is noted that in some circumstances, including secure environments, it is not sufficient to move a file to a "trash bin" folder, or remove indexing information for a file for it to be considered deleted-deletion may require an actual overwriting of the sectors containing the file (possibly multiple times) with a data pattern to obliterate the original file data, as well as sectors that contain file metadata, such as directories, pointers, affected regions of allocation and free lists. Further, a secure deletion operation (or other type of file system operation) may also require updating files that reference a deleted file.

In accordance with the present invention, file operations can have implicitly or explicitly specified completion times or other quality-of-service (QOS) parameters. As used herein, QOS refers generically to any parameter such as completion time, order of completion, scheduling considerations, etc. In other words, any real-time operation demand placed upon the files system performance is included in QOS. File operations may also exist having no specified completion times or other QOS consideration. Combinations of operations wherein some operations have specified completion times and/or QOS considerations and others having no specified completion times/orders are allowed.

The term file system or system as used herein refers to any and all artifacts required to implement the various file operations and related functions. It will be recognized by those of skill in the art that necessary infrastructure may be required for a practical file system. It will also be recognized that many alternatives exist for actual implementations of the inventive file system. Consequently, the invention is not limited to any particular implementation, programming language, execution platform, or operating system. Rather, the invention includes any and all implementations regardless of programming language, execution platform, or operating system. It will be further recognized that portions of the inventive file system may be implemented in hardware, software, or firmware. Likewise, programmable gate arrays, application-specific integrated circuits, and the like may be employed to define logic and data flow. The invention covers all implementations whether hardware, software, firmware or any combination thereof.

I. Specifying Scheduling Parameters of File Operations

The file system of the present invention permits completion deadlines (absolute or relative) to be associated with some or all of the file operations. Alternatively, QOS considerations such as, but not limited to relative priorities or other specifications of the quality-of-service desired can also be associated with some files or individual file operations.

For file operations having an associated completion deadline (time) or, alternatively A QOS requirement, the file system of the present invention provides several methods for specifying the deadlines or ordering requirement. The methods may be used individually or in combination as required in a particular circumstance.

An explicit specification of a QOS or deadline may be provided as an argument for a particular file operation being requested.

An explicit specification of the QOS requirement ordering or deadline may be specified by one or more commands or parameters separate from the requested file operation.

An implicit specification of the QOS requirement or deadline may be provided as part of the arguments for a particular file operation. An implicit specification can be derived from some of the arguments to the command, such as, but not limited to, the size of the data being accessed in the file operation and the time at which the operation is invoked.

For certain file operations, the deadline or QOS specification can be implicitly specified in dedicated data structures, for example, in data structures whose contents are specified at the time of configuring and initializing the file system.

II. Method of Scheduling File Operation Requests

The file system of the present invention permits file operations to be a mix of operations that demand real-time response with operations that do not necessarily demand real time responses. In addition, there may be operations which require processing to a certain stage within a certain time, but not necessarily to completion. In general, real-time requests are serviced (i.e., completed) within guaranteed time bounds. Such guarantees are not provided for non real-time storage access requests. File operation requests, whether real-time or not, have implicitly or explicitly assigned scheduling parameters. Additional information is associated with such requests to indicate whether they are real-time or not. The file system of the present invention schedules submitted requests to meet the timing guarantees of real-time requests as long as the system user has not specified an infeasible schedule.

The system may anticipate demands which cannot be guaranteed to be met prior to execution, and alert the user or cooperative system to the likely failure. In that case, the request may be changed, or a failure mode initiated. In some cases, though a guaranty of timely performance may not be made, the operation may nevertheless be completed within the required or requested time. Therefore, the failure mode need not presume that the operation cannot complete, merely that it is possible that it could not complete. In some cases, it may not be possible to determine with certainty when an operation will complete. For example, in operations which are data dependent (such as run length limited encoding) it is not possible to determine the file size until the data is available; in that case, a worst case assumption is applied.

With the use of storage devices that have an access delay dependent on the location where the accessed data is stored within the storage (i.e., a variable seek time), an embodiment according to the present invention uses a two phase request scheduling technique. Both phases may be implemented within either a single scheduling module or multiple modules. Hard disk drives (HDD), compact disk (CD), and digital video disk (DVD) drives are examples of devices that have a data access delay dependent on the location of the data being accessed. In some cases, hierarchal semiconductor memory systems may also have variable latencies depending on storage position. The term "pre-access" delay refers to the delay that is necessary for repositioning the access mechanism on the storage device from its current location to the location of the data that has to be accessed. The pre-access delay is thus dependent in general on the location of the data being accessed on a storage device by the file operation request. For a hard disk, a CD or a DVD, the pre-access time consists of at least the following three components: a flat latency component, a rotational latency component, and a seek time. The flat latency component comes from the controller that moves the disk head to the desired track. The seek time is the time it takes to move the disk head from its current position to the desired track. The rotational latency is the time it takes for the desired location on the desired track to rotate up to the position of the disk head.

In the first of these aforesaid request-scheduling phases, file operation requests are first decomposed into simpler, constituent file operation requests. The constituent file operation requests are then sorted based on implicitly or explicitly specified scheduling parameters such as, but not limited to, deadlines for completing the requests and/or relative priorities of the requests and whether these requests are real-time in nature or not. This first scheduling phase may require pre-empting a partially processed request. This, of course, assumes that the preempted request has not yet made changes to any of the contents of the storage device.

In the second phase of scheduling, a schedule is generated to reorder constituent requests selected in the first scheduling phase. The schedule optimizes the accesses that are to be made to the storage device. This is particularly important when a storage device has an access delay dependent on the location of the data being accessed. Each constituent request "C" selected in the first scheduling step is handled using at least the two following steps:

Step 1:

A check is first made to determine if "C" can be inserted into the existing schedule of operations for the storage device, as maintained in queue "Q" of requests for the device, such that the time needed to serve all requests in the schedule is minimized. What is considered in inserting a new request "C" is whether the scheduling requirements (e.g., the need to meet a specified time deadline) of all requests in this schedule can be met. To compute the service time needed for storage devices that have a location-dependent access delay, the pre-access time between consecutive storage accesses is accounted for in computing the time needed to serve all of the requests in the schedule. If such a schedule is possible, "C" is inserted into the queue "Q" of requests directed to the storage device. If such a schedule is not possible because the scheduling requirements of at least one of the requests already in the schedule would be violated, any non-real time requests in the request queue "Q" for the device are removed and placed in a temporary list "TL". Typically, during this step, the relative ordering of the constituent requests that make up a single file operation are maintained.

Step 2:

For each request in "TL", a check similar to that described in Step 1, is made to ascertain if the request can be inserted into the request queue "Q" for the device to minimize the service time for all requests in "Q". If such an insertion violates the scheduling requirement of any real-time request in the request queue "Q" for the device, the non real-time constituent request being processed is added at the tail of the request queue "Q". Typically, during this step, the relative ordering of the various constituent requests that make up a single file operation are maintained.

Optionally, any non real-time requests that have been pre-empted for a pre-specified number of times by the processing performed in Step 1 may be removed from the request queue for the device. Additionally, the priorities of non real-time requests in "TL" may be elevated before Step 2 is performed to ensure that they are not starved (i.e., postponed) indefinitely. Requests are scheduled from the head of the request queue "Q" of the storage device.

Of course, the ordering of separate file operations in queue "Q" may be altered or optimized.

For example, a combinatorial optimization may be performed to sequence the operations in the queue "Q" and optionally certain operations on the temporary list "TL" in order to increase efficiency. Alternately, various heuristics or algorithms may be employed to avoid a complete combinatorial optimization; for example, by ordering operations to permit the disk head to be repositioned in a set of monotonically increasing positions, the aggregate seek times may be minimized; if the required set of operations and deadlines does not permit this procedure, then the minimum number of thrashes is implemented, for example. An optimization procedure may be conducted as each operation is initiated and/or completed.

Referring first to FIG. 1, there is shown a flowchart of an exemplary embodiment of the first scheduling phase. This embodiment utilizes three queues, a queue "IQ" holding file operation requests submitted by the applications, a queue "HLRQ" holding the constituent file access operations of file operations following the schedule as generated in Phase one of the aforesaid scheduling technique and, a queue "LLRQ" that maintains the schedule of constituent storage access operations that target the device as generated during Phase one. The first scheduling phase begins with the selection of the first file operation "F" in the "IQ" and with the decomposition of "F" into constituent storage access requests, step 100.

If "F" is a non real-time request, step 105, it is assigned a default priority, usually the lowest scheduling priority and deposited into appropriate positions within the "HLRQ", step 110 and the first scheduling phase terminates. The default priority need not be the same for all processes, and the assigned priority may represent a time-function which, for example, seeks to produce a soft (statistical) real time performance for semi-critical functions. Thus, operations may be classified into various classes, for example those which must complete within a particular time window (hard real time), those which have a targeted completion time, within a probabilistic or statistical window (soft real time), and those which may be deferred or cancelled as necessary (non-real time).

If, however, the file operation "F" is a real-time request, step 105, its constituent requests are assigned priorities that are derived from the scheduling parameters of "F" in the appropriate manner, step 115.

Next, the constituent requests of "F" are inserted into positions within the "HLRQ" based on their assigned scheduling priorities, step 120 and optionally an optimization of the order of operations is conducted, since it is possible that a more optimal sequence is available than the preexisting order of operations. This optional task may itself consume time and system resources, and therefore the insertion of the constituent requests of "F" into the existing "HLRQ" is initially presumed to be near optimal.

The feasibility of scheduling the constituent requests of "F" together with the requests currently in the "HLRQ" is checked, step 125. If the constituent requests of "F" can be scheduled, step 125, the first scheduling phase terminates.

If, however, the scheduling requirements of any of the requests already in the "HLRQ", including the newly inserted requests, cannot be met, control is passed to step 130.

A check is made to see if a feasible schedule can be formed by preempting the partially completed processing of all constituent requests of a file operation at a priority lower than that of the constituent requests of "F", step 130. A feasible schedule refers to a schedule where all requests in the schedule are able to meet their scheduling requirements (e.g., meeting a time deadline). Generally, preemption is limited to requests that have not advanced beyond a prespecified point within their processing, such points being referred to as a "red line", step 130. If a feasible schedule is not possible after the aforesaid preemption, "F" is considered as non-feasible and appropriate status indications and actions are carried out, step 140, and this aspect of the scheduling phase terminates. As noted above, in some cases, a worst case performance may be predicted, but the actual performance may be better; for example, high priority tasks may be issued in an unpredictable manner, and the scheduling algorithm must consider the maximum number of such tasks which must be handled within a time window. Thus, while a flag or exception may be generated, this does not necessarily indicate that a failure has occurred, merely that a failure is possible. If, however, after one or more preemptions, step 130, a schedule is feasible, the "HLRQ" is rearranged to reflect that schedule and as the preempted requests are reinserted into the schedule at appropriate points in the "HLRQ", step 135, and this aspect of the scheduling phase terminates.

Figure 2:
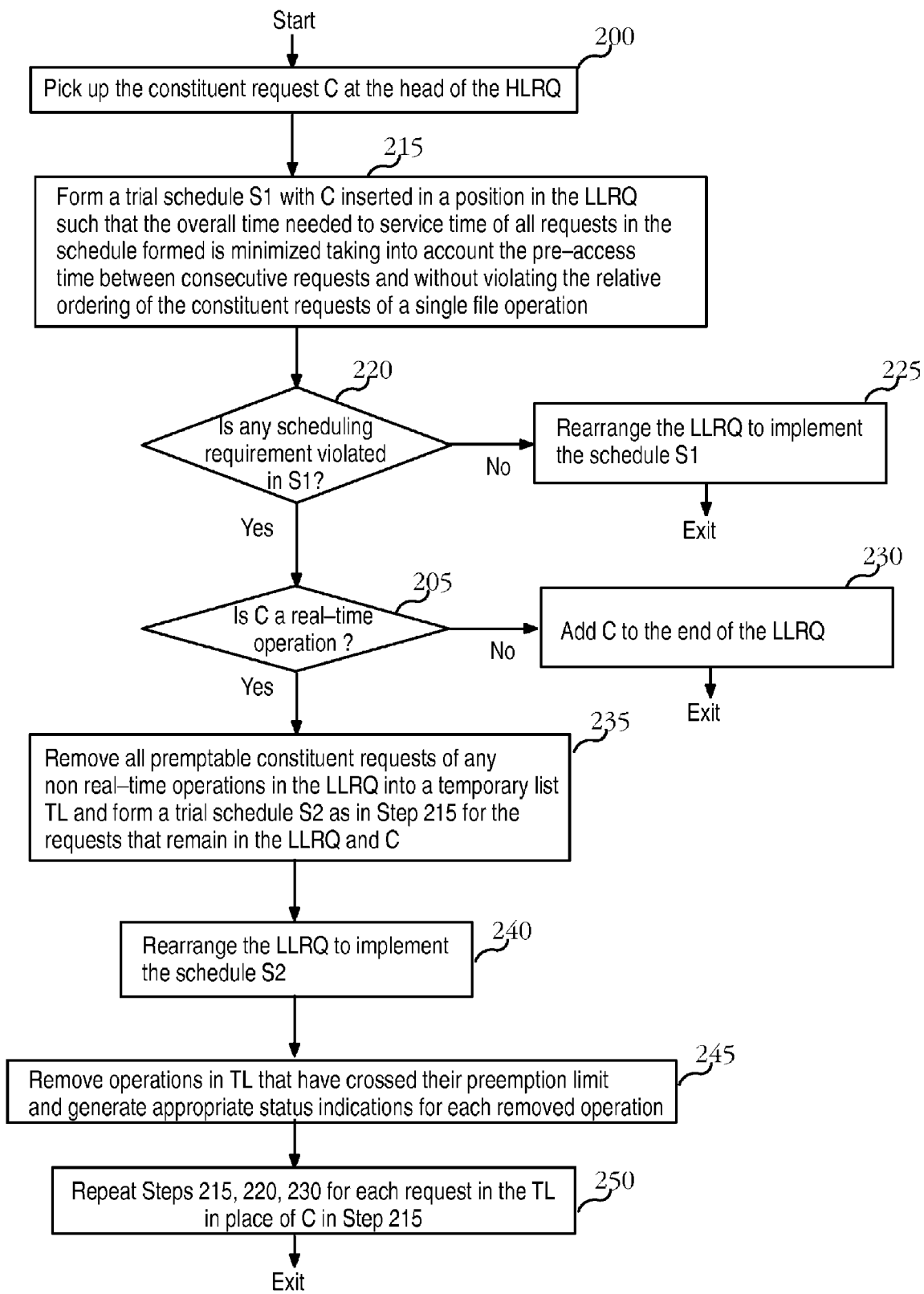
FIG. 2 is a flowchart of the second phase of a two-phase scheduling process in accordance with an embodiment of the invention.

Referring now to FIG. 2, there is shown a flowchart of an exemplary embodiment of the second scheduling phase. The second scheduling phase is typically used with storage devices that have an access delays dependent on the physical location of the data being accessed. The "IQ", "LRQ", and "LLRQ" are assumed present for phase 2 scheduling operations. The second scheduling phase begins with the selection of the first constituent storage access request "C" in the "HLRQ", step 200.

A tentative schedule S1 is formed by assuming that "C" is inserted into a position in "LLRQ" to minimize the total processing times for requests in the arbitrarily modified "LLRQ". It will be recognized that pre-access delays between consecutive requests in the "LLRQ" must be considered, step 215.

A check is made to determine if the schedule S1 is feasible, step 220. If the schedule S1 is feasible, the "LLRQ" is rearranged to reflect S1, and this aspect of the second scheduling phase terminates, step 225. If, however, the schedule S1 is not feasible, step 220, and if "C" is determined to be a non real-time request, step 205, "C" is simply added to the tail of "LLRQ" and this aspect of the scheduling phase terminates.

If, however, "C" is a real-time request and the schedule S1 is not feasible, some or all preemptable requests for non-real time operations are removed from the "LLRQ" and placed in a temporary list "TL", step 235, and a schedule S2 is then formed by inserting "C" in a position that minimizes (or meets a specified performance criteria for) the overall service time for all requests in the "LLRQ", step 235.

The "LLRQ" is then rearranged to conform to schedule S2, step 240.

According to one embodiment, all constituent operations "C" that have been removed from "LLRQ" a predetermined number of times are removed from "TL", step 245. Likewise, "LLRQ" may be analyzed to determine whether redundant operations are present; for example, a periodic preemptable housekeeping function may be initiated. If that function is preempted past the time that a subsequent function is initiated, then the first or second function may be cancelled. In one embodiment, one instance of the function is retained, with a higher priority representing the importance of the function and the aggregate delay since last completion.

Finally, any remaining requests in "TL" are added back to the "LLRQ" using the processes of steps 215-230. These steps are repeated until all requests in "TL" are processed or cancelled, step 250 after which, this aspect of the second processing phase terminates.

III. Preallocation of File Storage

In traditional file systems, storage for files are allocated incrementally on an as needed basis. Consequently, the physical storage areas occupied by a single file may not be contiguous. In storage devices that have a location dependent access delay, accesses to logically contiguous regions of the file, as perceived by the file user, may actually cause storage accesses to physically non-contiguous regions of the file and slow down the overall data access rate. Such physically segmented files may lead to a situation where it may be impossible for the file system to maintain reasonable bounds on file access times.

In fact, one example of a preemptable process is a file defragmenter/sector allocator.

One embodiment of the file system of the present invention provides preallocated contiguous regions of storage on the storage device. The space may be preallocated either at the time the file is created or at the time the file system physical spaces are initialized. Such preallocation ensures that file access operations may be completed in a timely and efficient fashion, particularly when the file is stored on a storage device that has an access delay that depends on the location of the data accessed on the storage. The need for such preallocation can be optionally specified, either explicitly or implicitly.

The need for preallocation may be explicitly specified in the command originally creating a file. When a file system is established, preallocation rules may be provided to avoid needing to make file-by-file decisions as files are individually created. The amount of storage required for the preallocation may also be explicitly specified, may be derived from configuration information, or may be implicit, relying on default values.

Alternatively, preallocation may be implicitly specified. According to one embodiment, preallocation process is adaptive and dynamic. That is, the preallocation is dependent on a status and/or context of the system. For example, a preallocation of storage space may require a preliminary process to clear a contiguous storage space, however, this may itself increase the time required to process the operation; therefore, the preallocation may be dynamically initiated in dependence on a file system load at the time of processing.

For example, files created in certain directories or storage regions may implicitly require or preferentially receive storage preallocation.

IV. Preallocation of File Caches

File systems typically employ buffer caches (i.e., memory) in the data transport path to improve the efficiency of file accesses to mass storage devices. In traditional file systems, such caches are allocated piecemeal on demand and a buffer management overhead may thus be incurred during file accesses.

In one embodiment of the file system of the invention, buffer caches are preallocated at the time a file is opened for access. This eliminates the possibility of buffer management overhead and speeds up file accesses. Because buffer cache parameters are known, file access times are kept more predictable.

The amount of buffer cache space that has to be preallocated may be specified implicitly or explicitly. The explicit specification for the size of the buffer cache may be supplied as an argument to the file open operation. Alternately, the specification in dedicated data structures, as in the case of specifications for the preallocation of file storage.

V. File Accessing Operations

The file operations for reading data from stored files or writing data to the files may take advantage of the preallocated file storage and buffers where applicable. These operations are scheduled in accordance with the scheduling process described hereinabove.

VI. Concurrent Operations on Files

An embodiment of the file system according to the present invention provides concurrent accesses to all or regions of a single file through multiple reading and writing processes. This is accomplished using a byte-range locking mechanism that permits a user to gain exclusive access to a specified range of bytes within the file. This permits multiple updates to independent regions of the file to take place concurrently. Regions that are not being updated can also be read concurrently by multiple processes.

Since other modifications and changes varied to fit particular operating requirements and environments will be apparent to those skilled in the art, the invention is not considered limited to examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method for managing access to a file storage system, comprising:

(a) providing at least one high level queue of operations each comprising at least one constituent task, at least one constituent task of the operations within the at least one high level queue being associated with a predicted latency of the file storage system, at least a portion of the operations having associated operation time constraints for completion, each operation in the at least one high level queue comprising at least one constituent task provided in at least one low level queue, at least a portion of the constituent tasks being constituent tasks having a completion order dependency, which are required to be executed in a predefined order;

(b) adding at least one new operation associated with a respective new operation time constraint for completion to the at least one high level queue, and at least one constituent task derived from the new operation to the at least one low level queue;

(c) analyzing at least one low level queue to determine whether the at least one low level queue can be reordered to permit all operations in the at least one high level queue to complete within their respective time constraints for completion, and in a case that the at least one low level queue cannot be reordered to permit all operations in the at least one high level queue to complete within their respective time constraints for completion, removing at least one constituent task from the at least one low level queue inconsistent with completion of processing of an operation within its respective associated operation time constraint for completion; and (d) reordering at least one low level queue, after said removing, to defer processing of at least one constituent task whose low level queue placement is inconsistent with completion of processing of the at least one new operation within the respective new operation time constraint, wherein a deferred low level queue position after reordering is after a constituent task which it was previously before, the order of the reordered at least one low level queue being consistent with an order dependency of the constituent tasks and completion of processing of the operations within the at least one high level queue within their respective operation time constraints.

2. The method according to claim 1, wherein at least a portion of the operations have no deadline for completion, further comprising the step of:

preempting at least one operation having no deadline for completion by the at least one new operation, wherein constituent tasks of the preempted operation are removed from the at least one low level queue.

3. The method according to claim 1, wherein at least one operation in the at least one queue has a deadline time constraint.

4. The method according to claim 1, wherein the at least one new operation and at least two operations in the at least one high level queue each have an associated priority, wherein a priority of a first operation is higher than a priority of a second operation, and wherein a priority of the at least one new operation is intermediate, wherein the second operation is deferred for anticipated completion after the at least one new operation.

5. The method according to claim 1, wherein at least one constituent task has a predicted latency to completion which is selectively dependent on a starting state of the file storage system, and wherein the at least one low level queue is reordered dependent on a predicted respective starting and ending state of the file storage system for a respective constituent task.

6. The method according to claim 1, wherein at least one operation is associated with a preassigned priority, and at least one operation is not associated with a preassigned priority.

7. A method for managing access to a file storage system, comprising:

(a) providing a queue of operations to be performed, each operation having a predicted latency, and at least a portion of the operations having associated operation time constraints for performance or relative priority according to a prioritization scheme;

(b) receiving at least one request for performance of a new operation having a predicted latency and an associated new operation time constraint for performance or relative priority;

(c) providing a queue of constituent tasks, derived from the queue of operations, the queue of constituent tasks being ordered independently of the queue of operations, at least a portion of the constituent tasks having a required order of completion of processing; and d) reordering the queue of constituent tasks consistent with the required order of processing and with performing queued constituent tasks having associated time constraints within their respective associated operation time constraints for performance or in accordance with the prioritization scheme, and removing selected constituent tasks from the queue of constituent tasks which are inconsistent with performing the remaining queued constituent tasks having associated time constraints within their respective associated operation time constraints for performance, based on at least available time and predicted latency, wherein said reordering comprises deferring at least one operation previously in the queue to a queue placement after the at least one new operation and after an operation it was previously before.

8. The method according to claim 7, wherein at least one operation is associated with a priority, wherein operations having respectively higher priorities are assured performance within respective associated operation time constraints ahead of operations having respectively lower priorities.

9. The method according to claim 7, wherein at least one operation is associated with a deadline, wherein said reordering step ensures that each deadline associated with a respective operation is met, and that an optimum ordered set of operations are completed within respective operation time constraints in dependence on available time slots, and a respective order sensitive to the state dependent predicted variable latency of respective operations.

10. The method according to claim 7, wherein at least one operation is associated with a deadline, a plurality of operations are associated with respective priorities, wherein said reordering step ensures that the deadline associated with the at least one operation is met, and that an optimum ordered set of operations permits respectively higher priority operations to be completed within any deadlines associated with the at least one operation ahead of respectively lower priority operations.

11. The method according to claim 7, wherein at least one constituent task is associated with a variable time between commencement and completion dependent on a file storage system state, and wherein the queue of constituent tasks is reordered in dependence on a respective predicted state of the file storage system at a predicted time of commencement of the at least one constituent task.

12. The method according to claim 7, wherein at least one operation is associated with a preassigned priority, and at least one operation is not associated with a preassigned priority.

13. A method for managing access to a file storage system, comprising:

(a) providing at least one scheduling queue of operations, at least a portion of the operations having associated operation time constraints for completion or a predetermined relative priority;

(b) receiving at least one request for completion of a new operation having a respective new operation time constraint for completion or a predetermined relative priority;

(c) inserting the new operation into the at least one scheduling queue of operations;

(d) defining at least one low level queue of constituent tasks dependent from operations in the at least one scheduling queue, at least a portion of the constituent tasks having a required order of completion of execution;

(e) reordering the at least one low level queue in accordance with a first criterion; and (f) subsequently reordering the at least one low level queue in accordance with a second criterion, wherein:

for at least one new operation, the reordering and subsequent reordering of the at least one low level queue together defer or preempt processing of at least one operation whose dependent constituent tasks pre-reordering placement in the low level queue is inconsistent with completion of processing of the new operation within the respective new operation time constraint, and the required order of execution is obeyed, the at least one operation which, if deferred, has its constituent tasks placed in a low level queue position consistent with completion within its associated operation time constraint and in accordance with its relative priority and after completion of at least one operation it was previously before, the consistency being determined based on low level queue order, and the available time, the respective low level queue ordering in any phase can result in the preemption or deferring of operations previously ordered by the respective scheduling queue ordering steps of each phase, the at least one low level queue is analyzed to remove dependent constituent tasks from a preempted operation, and constituent tasks in the low level queue resulting from the reordering of the at least one low level queue in accordance with a first criterion can be preempted by said subsequently reordering of the at least one low level queue in accordance with a second criterion.

14. The method according to claim 13, wherein at least a portion of the operations have no deadline for completion, further comprising the step of preempting at least one operation having no deadline for completion.

15. The method according to claim 13, wherein at least one operation in the at least one queue has a deadline time constraint.

16. The method according to claim 13, wherein the new operation and at least two operations in the at least one queue each have an associated priority, wherein a priority of a first operation is higher than a priority of a second operation, and wherein a priority of the new operation is intermediate, wherein the second operation is deferred or preempted.

17. The method according to claim 13, wherein at least one constituent task has a predicted time between commencement and completion varying in dependence on a starting state of the file storage system defined by at least one prior constituent task, and wherein the ordering of the low level queue is dependent on at least a predicted state of the file storage system upon commencement of the at least one constituent task.

18. The method according to claim 13, wherein at least one operation is associated with a preassigned priority, and at least one operation is not associated with a preassigned priority.

19. A file storage system, comprising:
(a) a queue of operations to be performed, at least a portion of the operations having associated operation time constraints for completion or a relative priority;
(b) an input for receiving at least one request for completion of a new operation having an associated new operation time constraint for completion or relative priority;
(c) a scheduler, which defines an ordering of constituent tasks dependent from the operations in the queue of operations in a low level queue, and inserts constituent tasks dependent from the new operation into the low level queue, and reorders the low level queue, consistent with performing all queued operations having associated time constraints within their respective associated operation time constraints and in accordance with any predetermined prioritization algorithm, and respecting any order dependence of the constituent tasks to avoid violation of order dependency of constituent tasks, based on at least available time, a queue order, and with respect to at least one new operation, either deferring at least one constituent task required for completion of at least one operation previously in the low level queue, after at least one constituent task required for completion of the new operation, and after a constituent task it was previously before, or preempting at least one constituent task in the low level queue which cannot be processed consistent with completion of the new operation within its new operation time constraint for completion and respecting the predetermined prioritization algorithm.

20. A system for managing access to a file storage system, comprising:
(a) an interface for communicating with a file storage system; and
(b) an automated control, adapted to:
(i) maintain at least one high level queue of operations to be performed, and generate entries in at least one low level queue of operations to be performed, the at least one low level queue containing component operations of respective composite operations in the at least high level queue, at least a portion of the operations in the high level queue having associated operation time constraints for completion or relative priorities, and at least a portion of the operations in the at least one high level queue of operations having a processing order completion dependence;
(ii) receive a request for completion of at least one new high level operation having an associated new operation time constraint for completion or a relative priority; and
(iii) automatically reordering at least the low level queue of operations, consistent with:
(1) the processing order completion dependence,
(2) performing all queued operations having associated time constraints within their respective associated operation time constraints, and
(3) a prioritization scheme dependent on the relative priorities,
wherein at least one operation in the at least one low level queue prior to the receipt of request for completion of the at least one new high level operation is deferred to a placement after an operation in the at least one low level queue it was previously before, and
wherein at least one low level queue of operations is analyzed for an inconsistency with the associated time constraints, and in an event of such an inconsistency, at least one high level operation is removed from the at least one high level queue to achieve consistency with the associated time constraints.

21. A method for operation of an automated system having predictable latency for operations, comprising:
(a) receiving a plurality of processes to be performed by the system into a first queue, at least a portion of the processes having a respective associated time window within which completion is required;
(b) determining a set of constituent tasks of the plurality of processes, at least a portion of the constituent tasks having a required relative order of execution;
(c) placing the set of constituent tasks together into a second queue, wherein constituent tasks of a first process are interspersed with constituent tasks of a second process, while respecting the associated time window within which completion is required and the required relative order of execution;
(d) receiving an additional process into the first queue, having a respective associated time window within which completion is required;

(e) determining a set of constituent tasks of the additional process, at least a portion of the constituent tasks having a required relative order of execution;
(f) if the respective associated time windows within which completion is required for each process can probably be observed, adding the set of constituent tasks of the additional process to the second queue, respecting the required relative order of execution of the constituent tasks of each process, selectively dependent on the predictable latency, wherein a relative order of execution of at least a portion of the constituent tasks of the first and second processes in the second queue is modified to meet the associated time window for completion of the first process, the second process, and the additional process;
(g) if maintenance of the first process, second process and additional process in the first queue will probably lead to a violation of respective associated time windows within which completion is required for each process, removing at least one process from the first queue, and its respective constituent tasks from the second queue, in dependence on a relative priority for each respective process; and
(h) executing with the automated system the constituent tasks in the order defined by the second queue to thereby complete the processes in the first queue within their respective associated time windows within which completion is required.

22. The method according to claim 21, wherein the automated system has a predicted latency for completion of a subsequent task which is selectively dependent on a state resulting from execution of a prior task, and wherein the second queue is ordered dependent on the predicted latencies resulting from execution of the series of states represented by the constituent tasks in the second queue.

* * * * *